(12) United States Patent　　(10) Patent No.:　US 12,565,298 B2
Ebihara et al.　　　　　　　　　　(45) Date of Patent:　　Mar. 3, 2026

(54) REDUCTION AND REVERSING GEAR UNIT

(71) Applicant: KANZAKI KOKYUKOKI MFG. CO., LTD., Amagasaki (JP)

(72) Inventors: Tomoyuki Ebihara, Amagasaki (JP); Shigeaki Nakagawa, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 430 days.

(21) Appl. No.: 18/341,191

(22) Filed: Jun. 26, 2023

(65) Prior Publication Data

US 2024/0002028 A1　　Jan. 4, 2024

(30) Foreign Application Priority Data

Jun. 29, 2022　(JP) ................................. 2022-104527

(51) Int. Cl.
　　B63H 23/08　　　(2006.01)
　　F16H 57/04　　　(2010.01)
(52) U.S. Cl.
　　CPC ......... B63H 23/08 (2013.01); F16H 57/0413 (2013.01)
(58) Field of Classification Search
　　CPC ........ B63H 23/00; B63H 23/02; B63H 23/06; B63H 23/08; B63H 23/30; B63H 21/20; B63H 21/38; B63H 2021/205; B63B 2035/009; F16H 57/0401; F16H 57/0413; F16H 57/04435; F16H 57/0447; F16H 61/0031; F16N 7/38; F16N 39/02
　　USPC ............................................... 440/75, 84, 86
　　See application file for complete search history.

(56) References Cited

U.S. PATENT DOCUMENTS 5,417,597 A * 5/1995 Levedahl ................ B63B 35/00
　　　　　　　　　　　　　　　　　　　　　　114/65 R
2013/0341934 A1* 12/2013 Kawanishi .............. F03D 9/007
　　　　　　　　　　　　　　　　　　　　　　290/55

FOREIGN PATENT DOCUMENTS

JP　　　　2021024491 A　　2/2021

* cited by examiner

*Primary Examiner* — Daniel V Venne
(74) *Attorney, Agent, or Firm* — CANTOR COLBURN LLP

(57)　　　　　　ABSTRACT

[Problem] In a reduction and reversing gear unit in which hydraulic oil is supplied to a generator motor or the like as cooling oil by a hydraulic pump driven by an electric motor, which is separate from the generator motor, a problem of a noise generated by fully driving the hydraulic pump and the electric motor at all time is solved by assuming a high hydraulic oil temperature when a maximum load acts on the generator motor.
[Solution] A reduction and reversing gear unit of the present invention includes an oil cooler disposed in a cooling oil passage that supplies hydraulic oil from an oil tank to a generator motor as cooling oil, a refrigerant pump disposed in a refrigerant piping caused to communicate with the oil cooler, an electric motor that drives the refrigerant pump, and a control unit that controls drive of the electric motor such that a discharge amount of the refrigerant pump is changed in accordance with a load detection value It of a load detection unit that detects a load acting on the generator motor.

8 Claims, 9 Drawing Sheets

REDUCTION AND REVERSING GEAR UNIT

CROSS REFERENCE TO RELATED APPLICATIONS

The present invention claims priority under 35 U.S.C. § 119 to Japanese Application, 2022-104527, filed on Jun. 29, 2022, the entire contents of which being incorporated herein by reference.

TECHNICAL FIELD

The present invention relates to a so-called hybrid-type reduction and reversing gear unit, in which a propeller is rotated by power of at least either one of an engine and a generator motor in a ship.

BACKGROUND ART

Conventionally, in a reduction and reversing gear unit for a ship such as pleasure boats, a so-called hybrid type that uses both power of an engine and power of a generator motor to improve efficiency of drive has been known (see Patent Document 1, for example).

PRIOR ART DOCUMENT

Patent Document

Patent Document 1: Japanese Patent Application Publication No. 2021-24491

SUMMARY OF INVENTION

Technical Problem

In the aforementioned conventional art, when a generator motor is singularly used as a drive source, it is configured such that, in a hydraulic pump driven by an electric motor separate from the generator motor, hydraulic oil is supplied to the generator motor or the like as cooling oil and the hydraulic oil is supplied to a gear group in the reduction and reversing gear unit as lubricating oil. In this case, assuming a high hydraulic-oil temperature when a maximum load is acting on the generator motor, the hydraulic pump and the electric motor are in full drive at all times so that they can be cooled even under these conditions.

Thus, there was a concern that a drive noise of these hydraulic pumps and electric motors would be louder than a noise emitted from the other devices, especially during navigation at a low speed, which results in an unpleasant impression to the periphery. There was also a problem of excessive power consumption since the electric motor is fully driven at all times.

Solution to Problem

In view of the above-mentioned circumstances, a technical problem of the present invention is to provide an improved reduction and reversing gear unit.

An invention of claim 1 is a reduction and reversing gear unit for transmitting power of at least either one of an engine and a generator motor mounted on a ship to a propeller via a forward/reverse rotation mechanism, including an oil cooler disposed in a cooling oil passage that supplies hydraulic oil from an oil tank to the generator motor as cooling oil, a refrigerant pump disposed in a refrigerant piping caused to communicate with the oil cooler, an electric motor that drives the refrigerant pump, and a control unit that controls drive of the electric motor so that a discharge amount of the refrigerant pump is changed in accordance with a load detection value of a load detection unit that detects a load acting on the generator motor.

An invention of claim 2 is that, in the reduction and reversing gear unit described in claim 1, the control unit drives the electric motor so that the discharge amount of the refrigerant pump is increased when the load detection value of the load detection unit exceeds a load upper-limit set value set in advance.

An invention of claim 3 is that, in the reduction and reversing gear unit described in claim 1, the control unit drives the electric motor so that the discharge amount of the refrigerant pump is decreased when the load detection value of the load detection unit falls below a load lower-limit set value set in advance.

An invention of claim 4 is a reduction and reversing gear unit for transmitting power of at least either one of an engine and a generator motor mounted on a ship to a propeller via a forward/reverse rotation mechanism, including an oil cooler disposed in a cooling oil passage that supplies hydraulic oil from an oil tank to the generator motor as cooling oil, a refrigerant pump disposed in a refrigerant piping caused to communicate with the oil cooler, an electric motor that drives the refrigerant pump, and a control unit that controls drive of the electric motor so that a discharge amount of the refrigerant pump is changed in accordance with a temperature detection value of a temperature detection unit that detects a temperature of the hydraulic oil in the cooling oil passage.

An invention of claim 5 is that, in the reduction and reversing gear unit described in claim 4, the control unit drives the electric motor so that the discharge amount of the refrigerant pump is increased when the temperature detection value of the temperature detection unit exceeds a temperature upper-limit set value set in advance.

An invention of claim 6 is that, in the reduction and reversing gear unit described in claim 4, the control unit drives the electric motor so that the discharge amount of the refrigerant pump is decreased when the temperature detection value of the temperature detection unit falls below a temperature lower-limit set value set in advance.

An invention of claim 7 is a reduction and reversing gear unit for transmitting power of at least either one of an engine and a generator motor mounted on a ship to a propeller via a forward/reverse rotation mechanism, including an oil cooler disposed in a cooling oil passage that supplies hydraulic oil from an oil tank to the generator motor as cooling oil, a refrigerant pump disposed in a refrigerant piping caused to communicate with the oil cooler, an electric motor that drives the refrigerant pump, and a control unit that controls drive of the electric motor so that a discharge amount of the refrigerant pump is changed in accordance with a load detection value of a load detection unit that detects a load acting on the generator motor and a temperature detection value of a temperature detection unit that detects a temperature of the hydraulic oil in the cooling oil passage.

An invention of claim 8 is that, in the reduction and reversing gear unit described in claim 7, when the load detection value of the load detection unit exceeds a load upper-limit set value set in advance, the control unit drives the electric motor so that the discharge amount of the refrigerant pump is increased, while, when the temperature detection value of the temperature detection unit falls below a temperature lower-limit set value set in advance, the control unit drives the electric motor so that the discharge amount of the refrigerant pump is decreased.

Advantageous Effects of Invention

According to the present invention, the control unit can determine a size of the load acting on the generator motor on the basis of the load detection value detected by the load detection unit, determine high or low of the temperature of the hydraulic oil in the cooling oil passage on the basis of the temperature detection value detected by the temperature detection unit or the like and can increase or decrease the discharge amount of the refrigerant pump when necessary by drive control of the electric motor. Unnecessary and excessive drive of the electric motor and the refrigerant pump can be suppressed, and an unpleasant drive noise of the electric motor and the refrigerant pump can be reduced without impairing a cooling effect of the generator motor by the hydraulic oil. Moreover, power consumption can also be suppressed by the drive control of the electric motor.

DESCRIPTION OF EMBODIMENTS

Hereinafter, embodiments which embody the present invention will be described on the basis of the drawings (FIG. 1 to FIG. 9).

Figure 1:
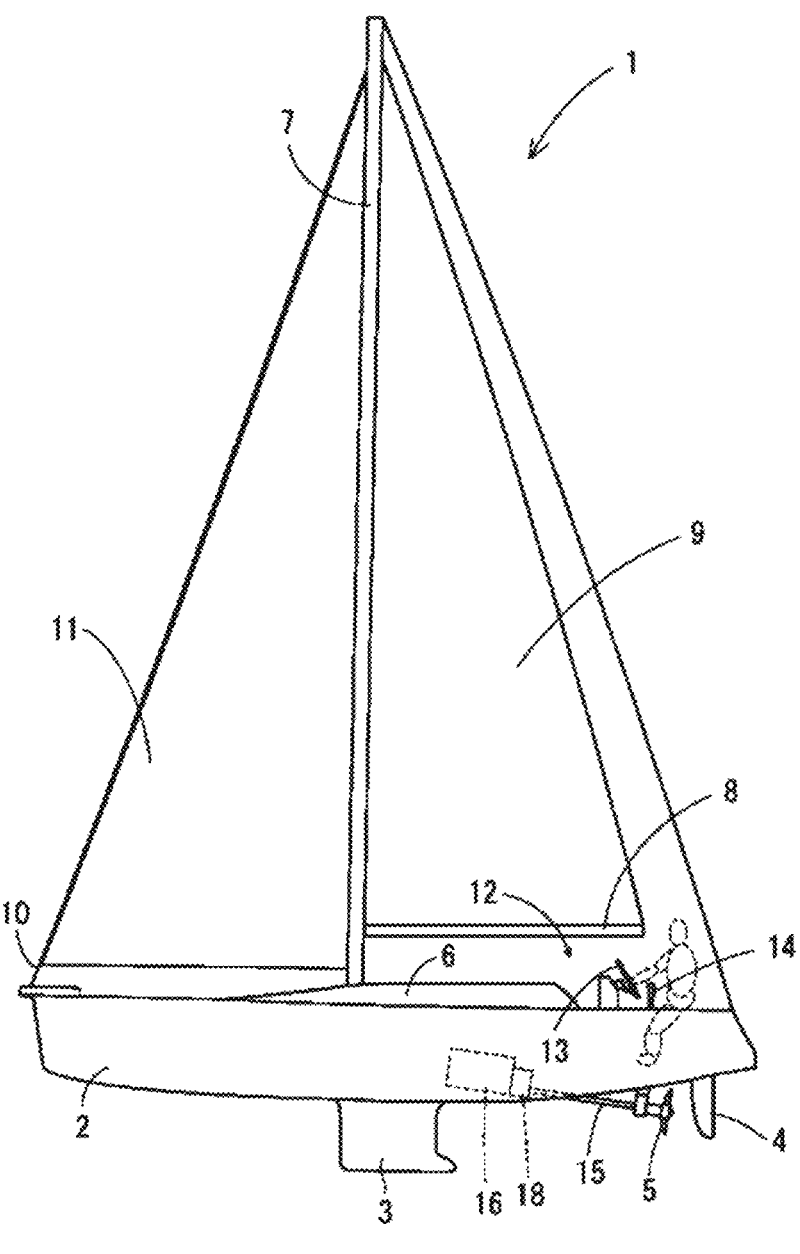
FIG. 1 is a side view of a yacht including a reduction and reversing gear unit.

A yacht 1 as a ship has, as shown in FIG. 1, a hull 2, a ballast keel 3 provided at a center side of a ship bottom of the hull 2, a rudder 4 provided on an aft side of the ship bottom of the hull 2, and a propeller 5 disposed between the ballast keel 3 and the rudder 4. A mast 7 is erected on an upper deck 6 located on an upper surface side of the hull 2. A boom 8 is provided at a lower part of the mast 7. A main sail 9 is stretched between the mast 7 and the boom 8. A wire rope 10 is connected to a bow side of the hull 2 and an upper end side of the mast 7. A jib sail 11 is stretched on the wire rope 10.

A steering portion 12 is provided on a rear of the mast 7. In the steering portion 12, a steering handle 13 that changes an advancing direction of the hull 2 to right or left by steering and a shift lever 14 that changes and operates forward movement, stop, backward movement and a navigation speed of the hull 2 are provided. A propulsion shaft 15, which rotates the propeller 5, is supported at the aft side on the ship bottom of the hull 2. The propeller 5 is attached to a protruding end side of the propulsion shaft 15.

Inside the hull 2, an engine 16, which is a drive source of the propeller 5, and a reduction and reversing gear unit 18 (marine gear device) for transmitting a rotary power of the engine 16 to the propeller 5 via the propulsion shaft 15 is provided. The rotary power transmitted from the engine 16 to the propulsion shaft 15 via the reduction and reversing gear unit 18 causes the propeller 5 to rotate.

Figure 2:
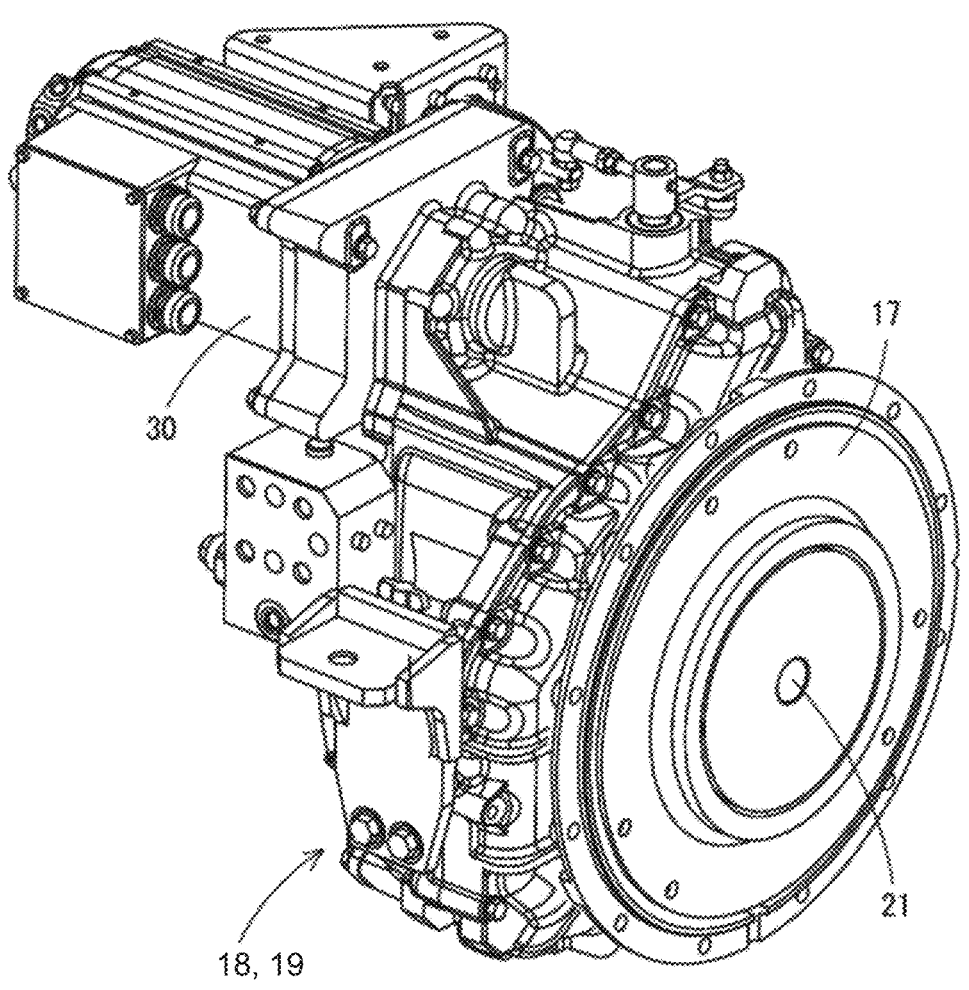
FIG. 2 is a perspective view illustrating an appearance of the reduction and reversing gear unit.
Figure 3:
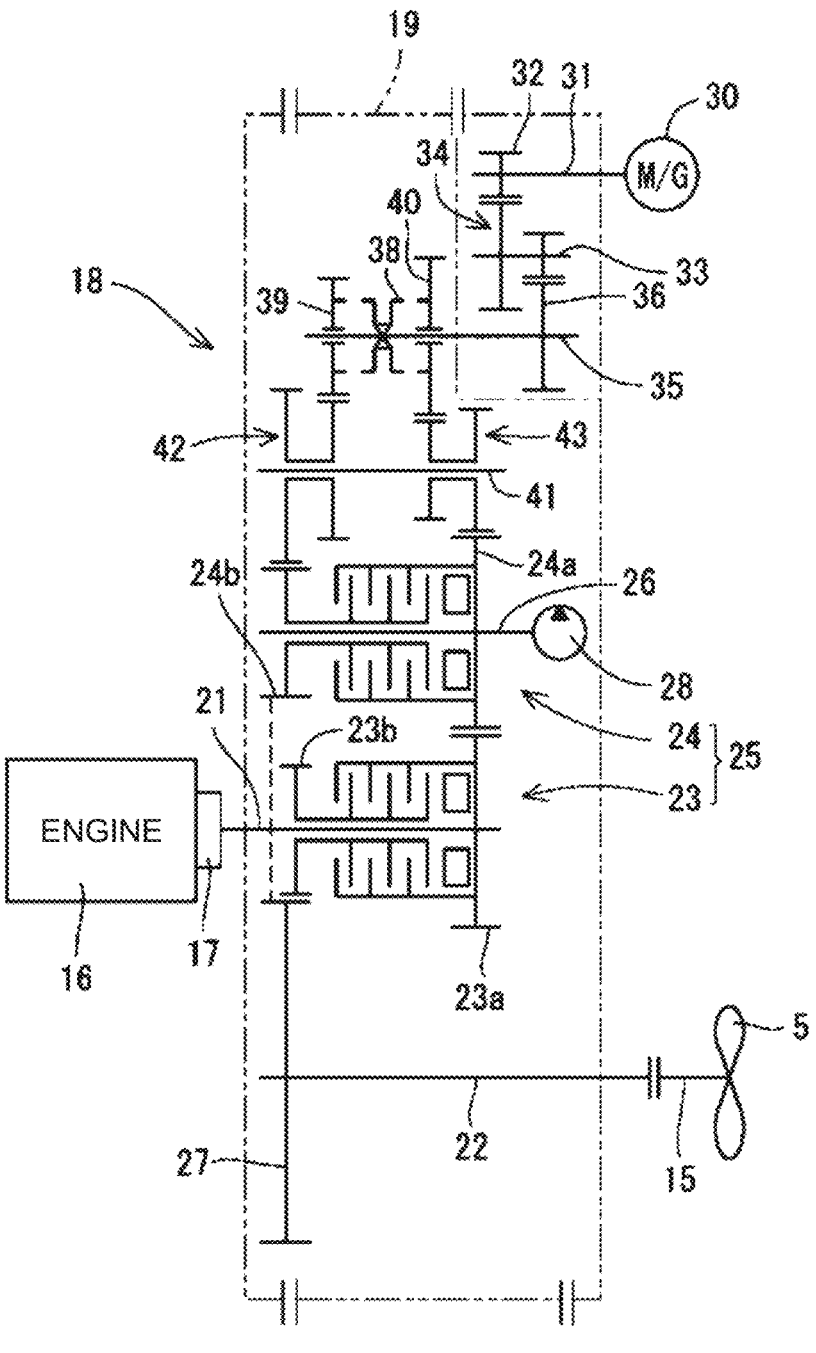
FIG. 3 is a skeleton diagram illustrating a power transmission system of the reduction and reversing gear unit.
Figure 4:
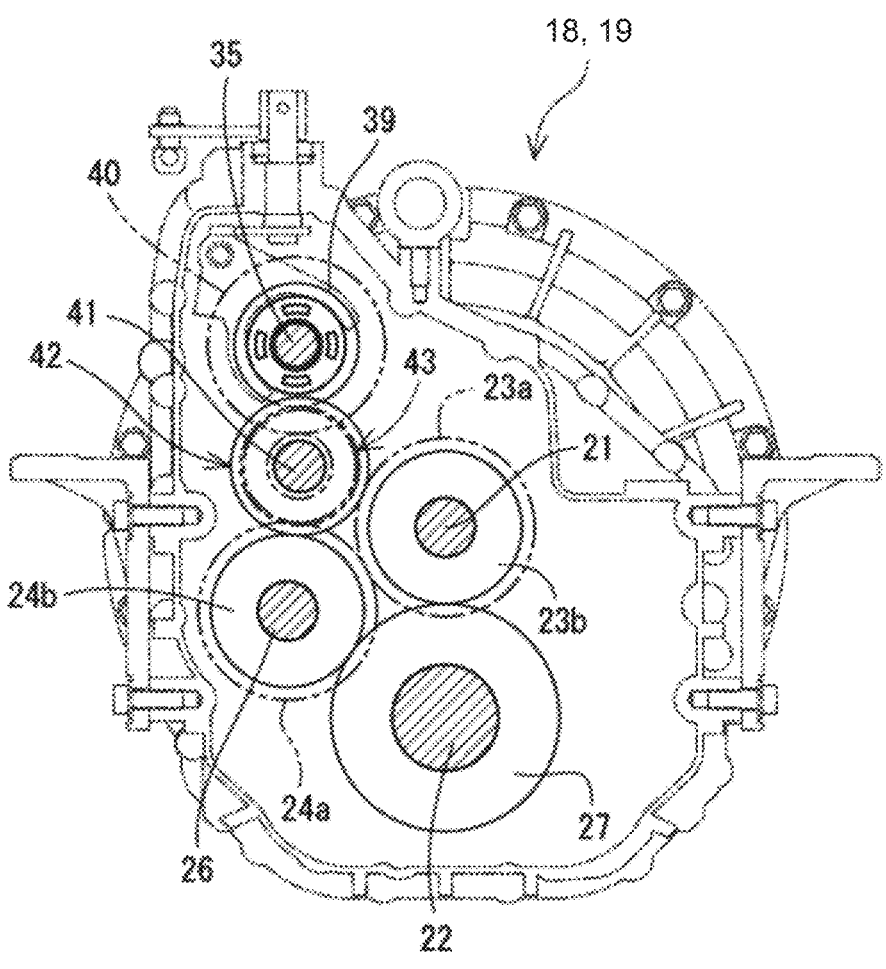
FIG. 4 is a schematic explanatory view illustrating a disposition relationship of a gear train in the reduction and reversing gear unit.

As shown in FIG. 2 to FIG. 4, the reduction and reversing gear unit 18 includes an input shaft 21 connected to a flywheel 17 of the engine 16, an output shaft 22 connected to the propulsion shaft 15, a forward rotation clutch 23 that connects and disconnects power in a forward rotation (forward movement) direction from the input shaft 21 to the output shaft 22, and a reverse rotation clutch 24 that connects and disconnects power in a reverse rotation (backward movement) direction from the input shaft 21 to the output shaft 22. The forward rotation clutch 23 and the reverse rotation clutch 24 constitute a forward/reverse rotation mechanism 25. The forward rotation clutch 23 and the reverse rotation clutch 24 are wet type multi-disc hydraulic friction clutches.

The forward rotation clutch 23 is disposed on the input shaft 21. A forward-rotation reduction gear 23b is formed on a downstream side (hub side) of power transmission from the engine 16 in the forward rotation clutch 23. A forward rotation gear 23a is formed on an upstream side (drum side) of the power transmission from the engine 16 in the forward rotation clutch 23. The forward rotation gear 23a is fixed to the input shaft 21. The forward-rotation reduction gear 23b is rotatably fitted to the input shaft 21.

The reverse rotation clutch 24 is disposed on a reverse rotation shaft 26 that extends in parallel to the input shaft 21. A reverse-rotation reduction gear 24b is formed on a downstream side (hub side) of the power transmission from the engine 16 in the reverse rotation clutch 24. A reverse rotation gear 24a is formed on an upstream side (drum side) of the power transmission from the engine 16 in the reverse rotation clutch 24. The reverse rotation gear 24a is fixed to the reverse rotation shaft 26. The reverse-rotation reduction gear 24b is rotatably fitted to the reverse rotation shaft 26.

The forward rotation gear 23a of the forward rotation clutch 23 is engaged with the reverse rotation gear 24a of the reverse rotation clutch 24 at all times. The forward-rotation reduction gear 23b and the reverse-rotation reduction gear 24b is engaged with a reduction output gear 27 fixed to the output shaft 22 at all times. The forward-rotation reduction gear 23b, the reverse-rotation reduction gear 24b, and the reduction output gear 27 constitute a reduction gear mechanism with a constant reduction ratio. Power of the output shaft 22 is reduced to a constant reduction ratio between each of the reduction gears 23b and 24b and the reduction output gear 27.

To the reverse rotation shaft 26, a main hydraulic pump 28 that supplies hydraulic oil to the forward rotation clutch 23, the reverse rotation clutch 24 and the like is attached. The main hydraulic pump 28 is configured to be driven by the rotation of the reverse rotation shaft 26 based on the power of the engine 16.

By bringing friction plates of each of clutches 23 and 24 into pressure contact by a hydraulic oil pressure, the input shaft 21 and the output shaft 22 are connected, capable of power transmission. In other words, by connecting the forward rotation clutch 23 and by shutting off the reverse rotation clutch 24, a forward movement state in which power of the input shaft 21 is transmitted to the output shaft 22 as power in the forward rotation (forward movement) direction is brought about. On the contrary, by shutting off the forward rotation clutch 23 and by connecting the reverse rotation clutch 24, a backward movement state in which the power of the input shaft 21 is transmitted to the output shaft 22 as power in the reverse rotation (backward movement) direction is brought about. By disconnecting both the forward rotation clutch 23 and the reverse rotation clutch 24, a neutral state in which the power of the input shaft 21 is not transmitted to the output shaft 22 is brought about.

A generator motor 30 which functions as a generator and an electric motor is attached to a housing 19 of the reduction and reversing gear unit 18. The generator motor 30 is configured to transmit power to the forward/reverse rotation mechanism 25 via a low-speed switching gear 39 and a high-speed switching gear 40. The generator motor 30 is connected to a power supply device 20 (see FIG. 6) that can be charged and discharged via an inverter 29. The generator motor 30 is configured to be driven as an electric motor by the electric power of the power supply device 20 constituted by a secondary battery or a large-capacity capacitor and the like, and to generate electric power by being driven as a generator on the basis of the power transmitted to the generator motor and to charge the power supply device 20.

In this case, a rotating shaft 31 of the generator motor 30 extends in parallel to the input shaft 21 and the reverse rotation shaft 26 and is inserted into the housing 19. A rotary gear 32 is fixed to the rotating shaft 31. Three shafts, that is, an intermediate shaft 33, a switching shaft 35, and a counter shaft 41, which extend in parallel to the input shaft 21 and the reverse rotation shaft 26, are provided in the housing 19. An intermediate gear pair 34 is fixed to the intermediate shaft 33. A relay gear 36 is fixed to the switching shaft 35. The rotary gear 32 of the rotating shaft 31 is engaged with one of the intermediate gear pair 34 at all times, and the other of the intermediate gear pair 34 is engaged with the relay gear 36 on the switching shaft 35 at all times.

A low-speed switching gear 39 and the high-speed switching gear which are connected to/disconnected from the switching shaft 35 by a switching operation of a switching shifter 38, are rotatably fitted to the switching shaft 35. The switching shifter 38 is fitted to the switching shaft 35 incapable of relative rotation but slidably with the axial direction. A reduction ratio between the low-speed switching gear 39 and the high-speed switching gear 40 can be different or the same. When the reduction ratio between the low-speed switching gear 39 and the high-speed switching gear is set to equal, it is desirable to use the generator motor 30 that can output a high torque when functioning as an electric motor.

A low-speed transmission gear pair 42 and a high-speed transmission gear pair 43 are rotatably fitted to the counter shaft 41. The low-speed switching gear 39 is engaged with one of the low-speed transmission gear pair 42 at all time, and the reverse-rotation reduction gear 24*b* on the downstream side (hub side) of the power transmission from the engine 16 in the forward/reverse rotation mechanism 25 is engaged with the other of the low-speed transmission gear pair 42 at all times. The high-speed switching gear 40 is engaged with one of the high-speed transmission gear pair 43 at all times, and the reverse rotation gear 24*a* on the upstream side (drum side) of the power transmission from the engine 16 in the forward/reverse rotation mechanism 25 is engaged with the other of the high-speed transmission gear pair 43 at all times.

The switching shifter 38 can be selectively engaged with the low-speed switching gear 39 and the high-speed switching gear 40 by drive of a switching actuator (not shown). The switching actuator is configured to switch and operate the switching shifter 38 in accordance with a navigation speed (rotation speed of the propeller 5). The switching actuator only needs to have electricity as a drive source and may be a hydraulic actuator using an electric motor or a pneumatic actuator, for example.

In a low-speed connection state where the low-speed switching gear 39 and the switching shifter 38 are engaged, the switching shaft 35 and the low-speed switching gear 39 rotate integrally and thus, the power can be transmitted between the generator motor 30 and the output shaft 22 via the low-speed switching gear 39. In a high-speed connection state in which the high-speed switching gear 40 and the switching shifter 38 are engaged, the switching shaft 35 and the high-speed switching gear 40 rotate integrally and thus, if either one of the forward rotation clutch 23 and the reverse rotation clutch 24 is in a connected state, the power can be transmitted between generator motor 30 and the output shaft 22 from the high-speed switching gear 40 via the forward rotation gear 23*a* or the reverse rotation gear 24*a*. In a shut-off state where the switching shifter 38 is not engaged with either of the switching gears 39 and 40, the power cannot be transmitted between the generator motor 30 and the output shaft 22 regardless of a connection situation of the forward rotation clutch 23 or the reverse rotation clutch 24 (brought into a neutral state).

During normal navigation, in a state where either one of the forward rotation clutch 23 and the reverse rotation clutch 24 is connected in accordance with an operation of the shift lever 14, the switching shifter 38 is switched and operated in accordance with the navigation speed (rotational speed of the propeller 5). When the yacht 1 is navigating at a low speed, the low-speed switching gear 39 and the switching shifter 38 are engaged by drive of the switching actuator and driven with the generator motor 30 as a generator. A surplus of the engine 16 power is, if the reverse rotation clutch 24 is in the connected state, transmitted from the reverse-rotation reduction gear 24*b* to the generator motor 30 via the low-speed transmission gear pair 42, the low-speed switching gear 39, and the intermediate gear pair 34, and the generator motor 30 generates electric power. The generated electric power is used to charge the power supply device 20.

When the yacht 1 is navigating at a high speed, the high-speed switching gear 40 and the switching shifter 38 are engaged by drive of the switching actuator and driven with the generator motor 30 as a generator. A surplus of the engine 16 power is transmitted from the reverse rotation gear 24*a* to the generator motor 30 via the high-speed transmission gear pair 43, the high-speed switching gear 40, and the intermediate gear pair 34, and the generator motor 30 generates electric power. The generated electric power is used to charge the power supply device 20.

Here, if the engine 16 is overloaded, the generator motor 30 is switched to be driven as an electric motor by the electric power from the power supply device 20. During low-speed navigation, the power of the generator motor 30 is transmitted to the reduction output gear 27 via the intermediate gear pair 34, the low-speed switching gear 39, the low-speed transmission gear pair 42, and the reverse-rotation reduction gear 24*b*, and a shortage of the engine 16 power is compensated by the power of the generator motor 30. During high-speed navigation, the power of the generator motor 30 is transmitted to the forward rotation gear 23*a* via the intermediate gear pair 34, the high-speed switching gear 40, the high-speed transmission gear pair 43, and reverse rotation gear 24*a*, and the shortage of the engine 16 power is compensated by the power of the generator motor 30. The generator motor 30 can be caused to function as an electric motor over the entire rotation region of the engine 16, and the power of the generator motor 30 as an electric motor can be effectively used to assist the engine 16 power.

When the yacht 1 is to be zero-started (navigation start) from a stopped and moored state, with the forward/reverse rotation mechanism 25 in a both shut-off state (state where both the forward rotation clutch 23 and the reverse rotation clutch 24 are shut-off), the low-speed switching gear 39 and the switching shifter 38 are engaged by the drive of the switching actuator, and the generator motor 30 is driven as an electric motor. The power of the generator motor 30 is transmitted to the reduction output gear 27 via the intermediate gear pair 34, the low-speed switching gear 39, the low-speed transmission gear pair 42, and the reverse-rotation reduction gear 24b. In other words, the power of the generator motor 30 is transmitted to the propeller 5 as power for navigation in the forward or the backward direction, and the yacht 1 starts moving forward or backward. During very low-speed navigation such as trolling, the propeller 5 can be rotated only by the power of the generator motor 30 in the same way as in a drive form at the zero start as described above.

When the yacht 1 is sailing, the generator motor 30 can also be caused to generate electric power by an idling force of the propeller 5. In this case, with the forward/reverse rotation mechanism 25 in the both shut-off state (state where both the forward rotation clutch 23 and the reverse rotation clutch 24 are shut off), the low-speed switching gear 39 and the switching shifter 38 are engaged by the drive of the switching actuator and driven with the generator motor 30 as a generator. The idling force of the propeller 5 caused by a tidal current or the like is transmitted to the reverse-rotation reduction gear 24b via the propulsion shaft 15, the output shaft 22, and the reduction output gear 27, and is transmitted to the generator motor 30 from the reverse-rotation reduction gear 24b via the low-speed transmission gear pair 42, the low-speed switching gear 39, and the intermediate gear pair 34, and the generator motor 30 generates electric power. The generated electric power is used to charge the power supply device 20.

When the yacht 1 is stopped and moored, the generator motor 30 can be caused to generate electric power by the power of the engine 16. In this case, with the forward/reverse rotation mechanism 25 in the both shut-off state (state where both the forward rotation clutch 23 and the reverse rotation clutch 24 are shut off), the high-speed switching gear 40 and the switching shifter 38 are engaged by the drive of the actuator and driven with the generator motor 30 as a generator. The engine 16 power is transmitted from the reverse rotation gear 24a to the generator motor 30 via the high-speed transmission gear pair 43, the high-speed switching gear 40, and the intermediate gear pair 34, and the generator motor 30 generates electric power. The generated electric power is used to charge the power supply device 20.

Subsequently, a structure of a hydraulic circuit of the reduction and reversing gear unit 18 will be described with reference to FIG. 5. A hydraulic circuit 50 of the reduction and reversing gear unit 18 includes the main hydraulic pump 28 that supplies hydraulic oil to the forward rotation clutch 23, the reverse rotation clutch 24 and the like. The main hydraulic pump 28 in the embodiment is configured to be driven by rotation of the reverse rotation shaft 26 based on the power of the engine 16.

The main hydraulic pump 28 is provided in the middle of a hydraulic oil passage 51, which communicates with the housing 19 as an oil tank. A strainer 48 is provided on a suction side of the main hydraulic pump 28 in the hydraulic oil passage 51. An ejection side of the main hydraulic pump 28 in the hydraulic oil passage 51 is connected to a forward rotation oil passage 53 toward the forward rotation clutch 23 and a reverse rotation oil passage 54 toward the reverse rotation clutch 24 via a forward/reverse-rotation solenoid valve 52.

The forward/reverse-rotation solenoid valve 52 is configured to be switchable among three positions, that is, a forward rotation position where the hydraulic oil is supplied to the forward rotation oil passage 53, a reverse rotation position where the hydraulic oil is supplied to the reverse rotation oil passage 54, and a neutral position where the hydraulic oil supply is stopped by exciting or demagnetizing the electromagnetic solenoid interlocking with an operation of the shift lever 14. The hydraulic oil is selectively supplied to the forward rotation clutch 23 or the reverse rotation clutch 24 by a switching action of the forward/reverse-rotation solenoid valve 52.

In the hydraulic oil passage 51, a lubrication and cooling oil passage is branched from between the main hydraulic pump 28 and the forward/reverse-rotation solenoid valve 52. The lubrication and cooling oil passage 55 is an oil passage for filling the hydraulic oil in the housing 19, as lubricating oil or cooling oil, for the generator motor 30, the inverter 29, and a gear group in the housing 19. The gear group is a concept that includes the forward/reverse rotation mechanism 25, the various gears, and other shafts in the housing 19.

The lubrication and cooling oil passage 55 has, in order from the upstream side, a first pressure-regulating valve 56, which is a relief valve for maintaining the hydraulic pressure in the hydraulic oil passage 51, a first oil cooler 57 and a second oil cooler 58, which cool the hydraulic oil as lubricating oil, the generator motor 30, and the inverter 29 provided. The generator motor 30 and the inverter 29 are disposed in the lubrication and cooling oil passage 55 for oil cooling. The downstream-most portion of the lubrication and cooling oil passage 55 is faced with the gear group in the housing 19, including the forward/reverse rotation mechanism 25, for lubrication and cooling.

A distribution oil passage 59 is branched from between the first oil cooler 57 and the second oil cooler 58 in the lubrication and cooling oil passage 55. In the middle of the distribution oil passage 59, a second pressure-regulating valve 60, which is a relief valve for maintaining the hydraulic pressure in the lubrication and cooling oil passage 55, is provided. The downstream-most portion of the distribution oil passage 59 merges with the lubrication and cooling oil passage 55 again at a point on the downstream side from the generator motor 30 and the inverter 29. A relief oil passage 62, which is branched from the re-merging part with the distribution oil passage 59 of the lubrication and cooling oil passage 55, is caused to communicate with the housing 19, which is an oil tank. A safety valve 61 is provided in the relief oil passage 62.

The hydraulic oil from the hydraulic oil passage 51 having passed through the first pressure-regulating valve 56 passes through the first oil cooler 57, is reduced to a low pressure by the second pressure-regulating valve 60 and then, further passes through the second oil cooler 58 and is supplied as cooling oil to the generator motor 30 and the inverter 29. The hydraulic oil having passed through the generator motor 30 and the inverter 29 is supplied (reused) as lubricating oil to the gear group, including the forward/reverse rotation mechanism 25. The hydraulic oil sent from the lubrication and cooling oil passage 55 to the distribution oil passage 59 and having passed through the second pressure-regulating valve 60 is supplied as lubricating oil to the gear group including the forward/reverse rotation mechanism 25 after being reduced to a low pressure by the safety valve 61. Unnecessary hydraulic oil above a predetermined pressure in the lubrication and cooling oil passage 55 is returned into the housing 19 via the safety valve 61.

In the first pressure-regulating valve 56, which is a relief valve for maintaining a hydraulic pressure in the hydraulic oil passage 51, a clutch hydraulic pressure adjusting valve 63 that reduces a shock at connection of the forward/reverse rotation mechanism 25 is provided. The clutch hydraulic pressure adjusting valve 63 is configured to be controlled by a hydraulic switching valve 64 that uses the hydraulic pressure of the forward rotation oil passage 53 and the reverse rotation oil passage 54 as pilot pressures. In the hydraulic oil passage 51, a pilot oil passage 65 is branched from between the branch spot to the lubrication and cooling oil passage 55 and the forward/reverse-rotation solenoid valve 52 and is connected to the clutch hydraulic pressure adjusting valve 63. The hydraulic switching valve 64 has a cylinder 64a, a piston 64b, and a return spring 64c, and is configured to be switchable between two positions, that is, an ON position where a pilot pressure is supplied to the clutch hydraulic pressure adjusting valve 63 and an OFF position where supply of the pilot pressure is stopped.

When the forward/reverse-rotation solenoid valve 52 switches and operates to the forward rotation or reverse rotation position, and when the hydraulic oil is supplied to the forward rotation or reverse rotation oil passage 53 or 54, and the hydraulic pressure in the cylinder 64a rises, the piston 64b moves, and the hydraulic switching valve 64 is switched to the ON position. Then, a pilot pressure is supplied to the clutch hydraulic pressure adjusting valve 63 via the pilot oil passage 65, and the clutch hydraulic pressure adjusting valve 63 gradually compresses a relief spring 66 of the first pressure-regulating valve 56, which results in a gradual increase of a set relief pressure of the first pressure-regulating valve 56. As a result, the hydraulic pressure of the hydraulic oil passage 51 and the forward rotation or reverse rotation oil passage 53 or 54 gradually rises, and the forward rotation or reverse rotation clutch 23 or 24 is gradually brought into a connected state.

Then, when an urging force of the relief spring 66 reaches the maximum, the hydraulic pressure between the hydraulic oil passage 51 and the forward rotation or reverse rotation oil passage 53 or 54 is maximized, and the forward rotation or reverse rotation clutch 23 or 24 is brought into a completely connected state. As described above, a shock at connection of the forward rotation or reverse rotation clutch 23 or 24 is mitigated.

When the forward/reverse-rotation solenoid valve 52 is switched and operated to the neutral position, and the supply of the hydraulic oil to the forward rotation and reverse rotation oil passages 53, 54 ceases, the hydraulic switching valve 64 is switched to the OFF position by the urging force of the return spring 64c, and the clutch hydraulic pressure adjusting valve 63 and the relief spring 66 of the first pressure-regulating valve 56 return to their original states. In this state, the first pressure-regulating valve 56 functions as a relief valve with a small set relief pressure.

The engine 16 of the embodiment includes a first refrigerant pump 67 driven by its own power similarly to the main hydraulic pump 28 to take in a refrigerant outside the ship and a cooling passage 68 for oil cooling or water cooling. An engine cooling cooler 69 is provided in the cooling passage 68 of the engine 16. The yacht 1 as a ship includes a first refrigerant piping 71 and a second refrigerant piping 72 through which a refrigerant such as seawater flows, and a second refrigerant pump 74 driven by the power of an electric motor 73 for refrigerant, to take in a refrigerant outside the ship.

On the first refrigerant piping 71, the first refrigerant pump 67, the engine cooling cooler 69, and the first oil cooler 57 are disposed in order from the upstream side. On the second refrigerant piping 72, the second refrigerant pump 74 and the second oil cooler 58 are disposed in order from the upstream side. The refrigerant such as seawater sucked up by the first refrigerant pump 67 from an inlet side of the first refrigerant piping 71 via a strainer is first supplied to the engine cooling cooler 69. Then, after oil or water in the cooling passage 68 is cooled, the refrigerant is subsequently supplied to the first oil cooler 57 and cools the hydraulic oil in the lubrication and cooling oil passage 55. The refrigerant such as seawater that has passed through the first oil cooler 57 is released to outside the ship from an outlet side of the first refrigerant piping 71. The refrigerant such as seawater outside the ship sucked up from the inlet side of the second refrigerant piping 72 via a strainer by the second refrigerant pump 74 is supplied to the second oil cooler 58, and after cooing the hydraulic oil in the lubrication and cooling oil passage 55, the refrigerant is released to outside the ship from an outlet side of the second refrigerant piping 72.

Figure 5:
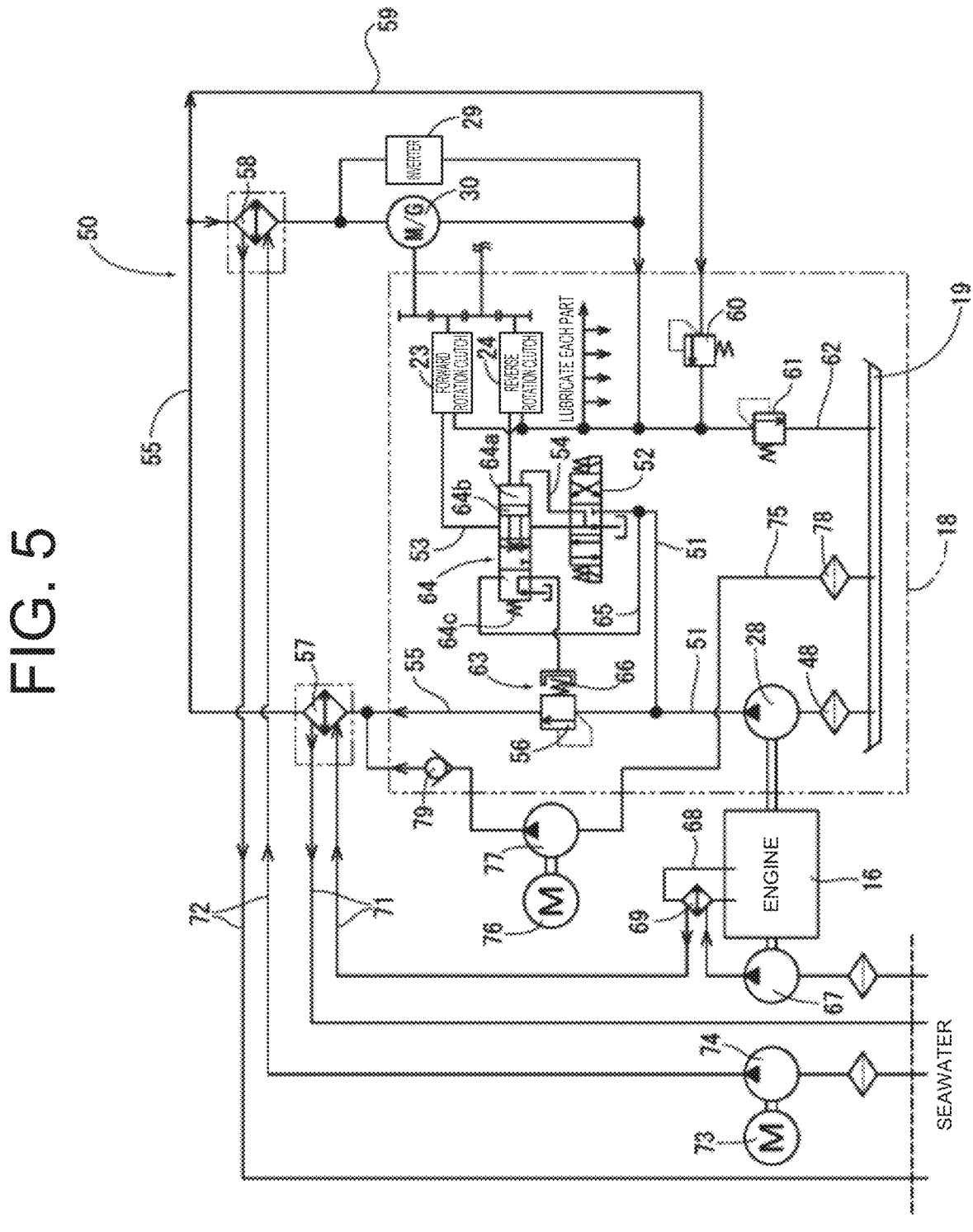
FIG. 5 is an explanatory view illustrating a hydraulic circuit in the reduction and reversing gear unit.

As shown in FIG. 5, the hydraulic circuit 50 of the embodiment has a bypass oil passage 75 that connects the housing 19 as an oil tank and the lubrication and cooling oil passage 55. A sub hydraulic pump 77 driven by the power of an electric motor 76 for lubrication is provided in the middle part of the bypass oil passage 75. A strainer 78 is provided on a suction side of the sub hydraulic pump 77 in the bypass oil passage 75. On an ejection side of the sub hydraulic pump 77 in the bypass oil passage 75, a check valve 79 that opens only to the lubrication and cooling oil passage 55 is provided. In the embodiment, the downstream-most portion of the bypass oil passage 75 is connected between the first pressure-regulating valve 56 and the first oil cooler 57 in the lubrication and cooling oil passage 55.

Subsequently, with reference to FIG. 6 and thereafter, a configuration and a control form in which the drive control of the electric motor 73 for refrigerant (discharge amount control of the second refrigerant pump 74) is executed in the embodiment will be explained.

Figure 6:
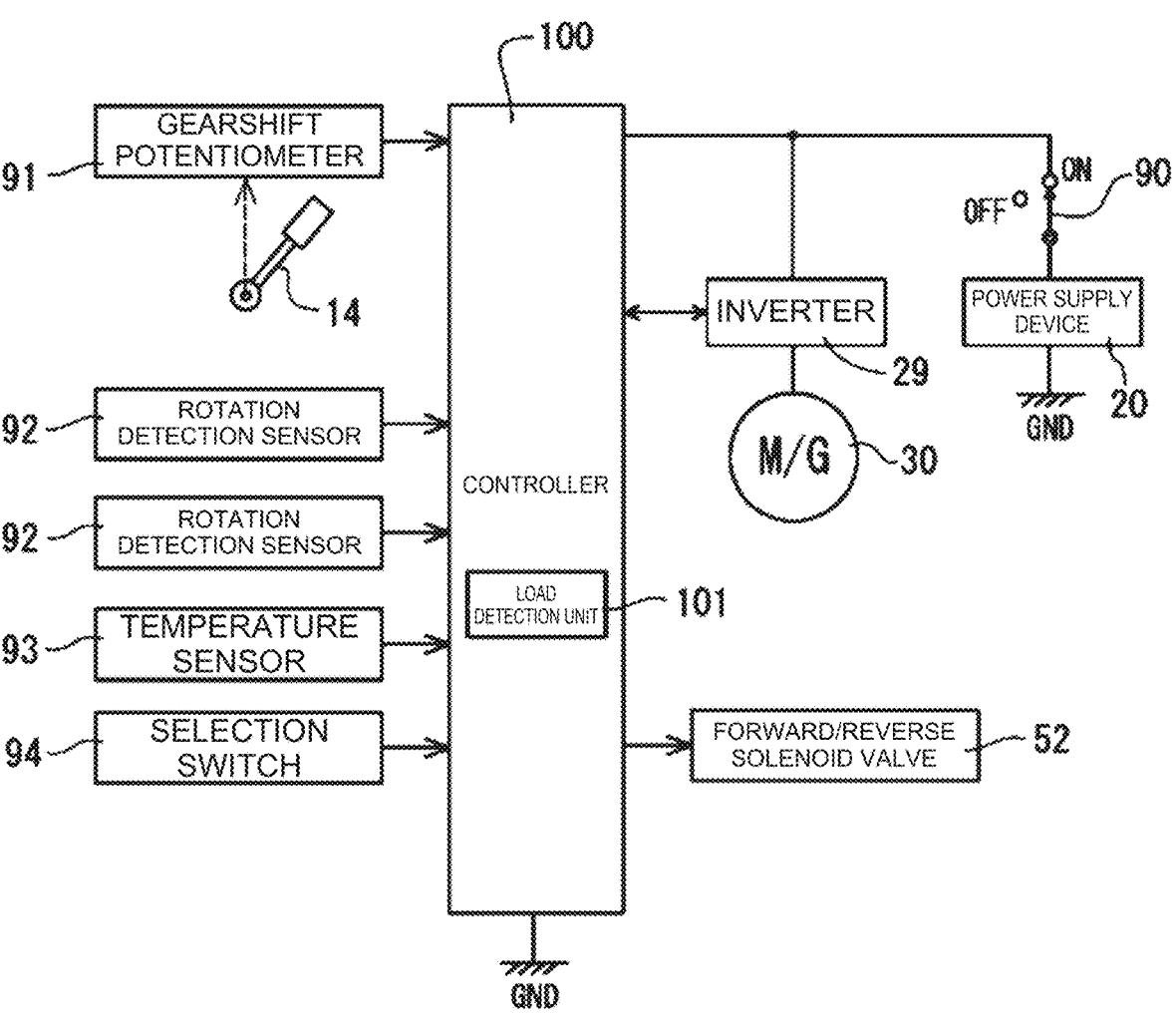
FIG. 6 is a functional block diagram of a controller.

As shown in FIG. 6, the generator motor 30 is connected to the power supply device 20, which is constituted by a rechargeable secondary battery, a large-capacity capacitor or the like that can be charged and discharged, via the inverter 29 having a switching element such as a transistor and a diode. The inverter 29 supplies the electric power from the power supply device 20 to the generator motor 30 by DC-AC conversion through an ON/OFF operation of the switching element so as to be operated as an electric motor. When the generator motor 30 operates as a generator, the inverter 29 causes the electric power of the generator motor 30 is used to charge the power supply device 20 by AC-DC conversion of a diode bridge. In other words, the generator motor 30 is configured to reversibly convert mechanical energy from the engine 16 side and electrical energy from the power supply device 20 side.

The inverter 29 is electrically connected to a controller 100 as a control unit mounted on the yacht 1. The controller 100 mainly controls the overall operation of the engine 16 and the reduction and reversing gear unit 18 and is configured to output a PWM (Pulse Width Modulation) signal to the inverter 29 so as to turn ON/OFF the switching element in the inverter 29, whereby the generator motor 30 is driven as an electric motor (motor).

As shown in FIG. 6, to the controller 100, in addition to the inverter 29, a gearshift potentiometer 91 that detects an operation position of the shift lever 14, a pair of rotation detection sensors 92 that detect an output rotation speed of the output shaft 22 (or may be the propulsion shaft 15), a temperature sensor 93 as a temperature detection unit that detects a temperature of the hydraulic oil in the lubrication and cooling oil passage 55, the forward/reverse-rotation solenoid valve 52 that controls the operation of the forward/reverse rotation mechanism 25 and the like, for example, are electrically connected. To the controller 100, electric power is supplied from the power supply device 20 via a key switch 90. The temperature sensor 93 as a temperature detection unit is disposed in a periphery of the second oil cooler 58, the first oil cooler 57, the both oil coolers 57, 58, or the like.

The controller 100 can select and execute any one of a charge mode using the generator motor 30 as a generator, an assist mode in which the generator motor 30 as an electric motor is used with the engine 16, a motor mode in which the generator motor 30 as an electric motor is used singularly as a drive source, and an engine mode in which the engine 16 is used singularly as a drive source. To the controller 100, a selection switch 94 for selecting various modes is also electrically connected.

Although details are omitted, the controller 100 includes a CPU that executes various types of arithmetic processing and controls, a ROM for storing control programs and data, a RAM for temporarily storing control programs and data, an input/output interface, and the like.

The controller 100 has a load detection unit 101 that detects a load acting on the generator motor 30. The load detection unit 101 of the embodiment has a function of detecting an inverter current value It, which is an output current value of the inverter 29. The inverter current value It is an AC current value supplied to the generator motor 30 and is proportional to a load detection value, which corresponds to a work load of the propeller 5 and thus, the generator motor 30.

The controller 100 also has a function of controlling an inverter frequency Ft, which is a frequency of an output current of the inverter 29. The inverter frequency Ft is proportional to an output rotation number of the generator motor 30 and thus, the output shaft 22 (may be the propulsion shaft 15). Therefore, the inverter frequency Ft is proportional to the propeller 5 rotation number in the motor mode.

In the motor mode, the controller 100 controls the inverter frequency Ft (propeller 5 rotation number) in accordance with a detection value of the gearshift potentiometer 91 (operation amount of the shift lever 14) and controls the rotational drive of the electric motor 30 so that the propeller 5 rotation number is based on the inverter frequency Ft.

Figure 7:
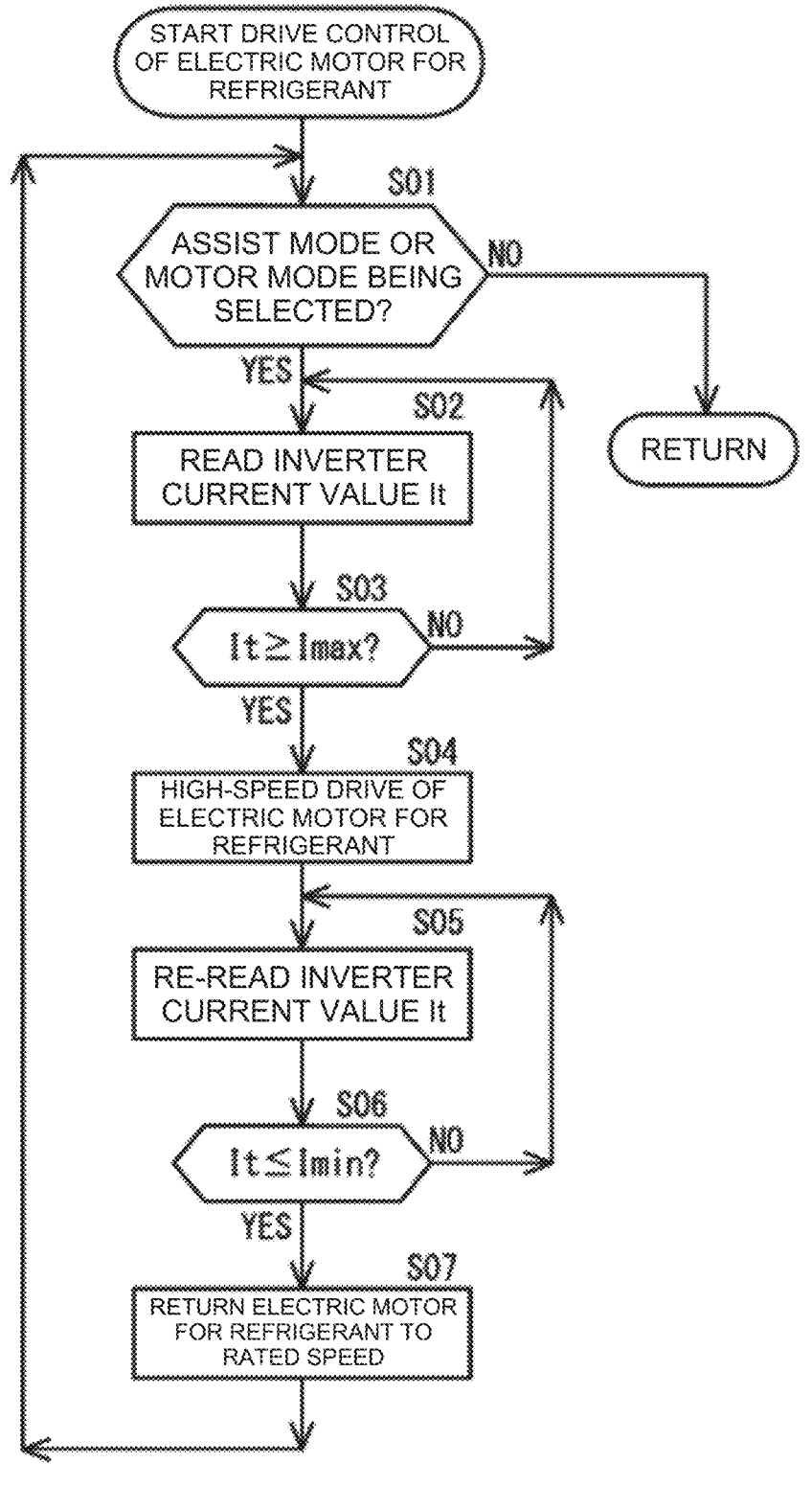
FIG. 7 is a first example of a flowchart of drive control of an electric motor for refrigerant.

A flowchart in FIG. 7 shows a first example of the drive control of the electric motor 73 for refrigerant (discharge-amount control of the second refrigerant pump 74) in the embodiment. An algorithm shown in a flowchart disclosed below is stored in the ROM of the controller 100 in advance as a program and is read out into the RAM and is executed by the CPU. Here, it is assumed that the electric motor 73 for refrigerant is driving at a rated speed so that the second refrigerant pump 74 realizes a predetermined discharge amount.

In the first example, if the assist mode or the motor mode is being selected and operated by the operation of the selection switch 94 (S01: YES), the generator motor 30 is functioning as an electric motor and thus, the controller 100 reads the inverter current value It, which is the output current value of the inverter 29, at the load detection unit 101 (S02) and determines whether the inverter current value It is equal to or larger than a load upper-limit set value Imax set in advance (S03).

In this case, it is preferable that the load upper-limit set value Imax is set to a value corresponding to a case where the temperature of the hydraulic oil (cooling oil) passing through the generator motor 30 is approximately 90° C., for example. When the temperature of the hydraulic oil becomes higher than 90° C., for example, oil-film forming capability of the hydraulic oil when the hydraulic oil is used as lubricating oil is drastically deteriorated, which can easily cause gear damage, and materials such as synthetic resins and rubber used for sealing components or the like are susceptible to high temperatures. Thus, a value corresponding to a hydraulic oil temperature around 90° C. is used as the load upper-limit set value Imax. At Step S03, the load upper-limit current value Imax itself may be included on a lower side or a higher side. At Step S03, it is included on the high side.

At Step S03, if the inverter current value It is equal to or larger than the load upper-limit set value Imax (It≥Imax, S03: YES), a load torque of the generator motor 30 increases and a large output current flows from the inverter 29 in order to maintain the output rotation speed of the generator motor 30 and thus, it is obvious that, if such a state continues for a long time, the temperature of the hydraulic oil passing through the generator motor 30 and the inverter 29 will rise rapidly.

Thus, in order to prevent a rapid rise in the temperature of the hydraulic oil, the electric motor 73 for refrigerant is driven at a speed higher than the rated speed so as to increase the discharge amount of the second refrigerant pump 74 (S04). As the result of the increased discharge amount of the second refrigerant pump 74 by the high speed drive of the second oil cooler 58, the hydraulic oil is sufficiently cooled. The generator motor 30 and the inverter 29 are then quickly oil-cooled. At Step S03, if the inverter current value It is less than the load upper-limit set value Imax (It<Imax, S03: NO), the processing returns to Step S02.

After driving the electric motor 73 for refrigerant at the high speed at Step S04, the inverter current value It is read again by the load detection unit 101 (S05), and it is determined whether the inverter current value It is equal to or smaller than the load lower-limit set value Imin set in advance (S06). It is preferable that the load lower-limit set value Imin is set to a value corresponding to a case where the temperature of the hydraulic oil (cooling oil) passing through the generator motor 30 is approximately 70° C., for example. When the temperature of the hydraulic oil falls below 70° C., for example, the oil-film forming capability of the hydraulic oil when used as lubricating oil becomes high enough to exert a high effect in preventing gear damage, and agitation resistance becomes low. Thus, a value corresponding to a hydraulic oil temperature around 70° C. is used as the load lower-limit set value Imin. At Step S06, too, the load lower-limit current value Imin itself may be included on a lower side or a higher side. At Step S06, it is included on the lower side.

At Step S06, if the inverter current value It is equal to or smaller than the load lower-limit set value Imin (It≤Imin, S06: YES), a load torque of the generator motor 30 was reduced and the output current from the inverter 29 was suppressed and thus, it is considered that the temperature of the hydraulic oil passing through the generator motor 30 and the inverter 29 is kept low.

Thus, the drive speed of the electric motor 73 for refrigerant is returned to the original rated speed, and the discharge amount of the second refrigerant pump 74 is returned to the original predetermined discharge amount (S07). At Step S06, if the inverter current value It is larger than the load lower-limit set value Imin (It>Imin, S06: NO), the processing returns to Step S05.

After returning the drive speed of the electric motor 73 for refrigerant to the original rated speed at Step S07, the processing returns to Step S01.

When controlled as described above, the controller 100 can determine the size of the load acting on the generator motor 30 on the basis of the inverter current value It detected by the load detection unit 101 and increase or decrease the discharge amount of the second refrigerant pump 74 when necessary, by controlling the drive of the electric motor 73 for refrigerant. Unnecessary and excessive drive of the electric motor 73 for refrigerant and the second refrigerant pump 74 can be suppressed, and an unpleasant drive noise of the electric motor 73 for refrigerant or the second refrigerant pump 74 can be reduced without impairing a cooling effect of the generator motor 30 by the hydraulic oil. Moreover, power consumption can also be suppressed by the drive control of the electric motor 73 for refrigerant. In particular, in the first example, since start of a rise in a hydraulic oil temperature is determined by the size of the load acting on the generator motor 30 on the basis of the inverter current value It, the rise in the hydraulic oil temperature can be dealt with quickly, and the rise in the hydraulic oil temperature can be suppressed.

Figure 8:
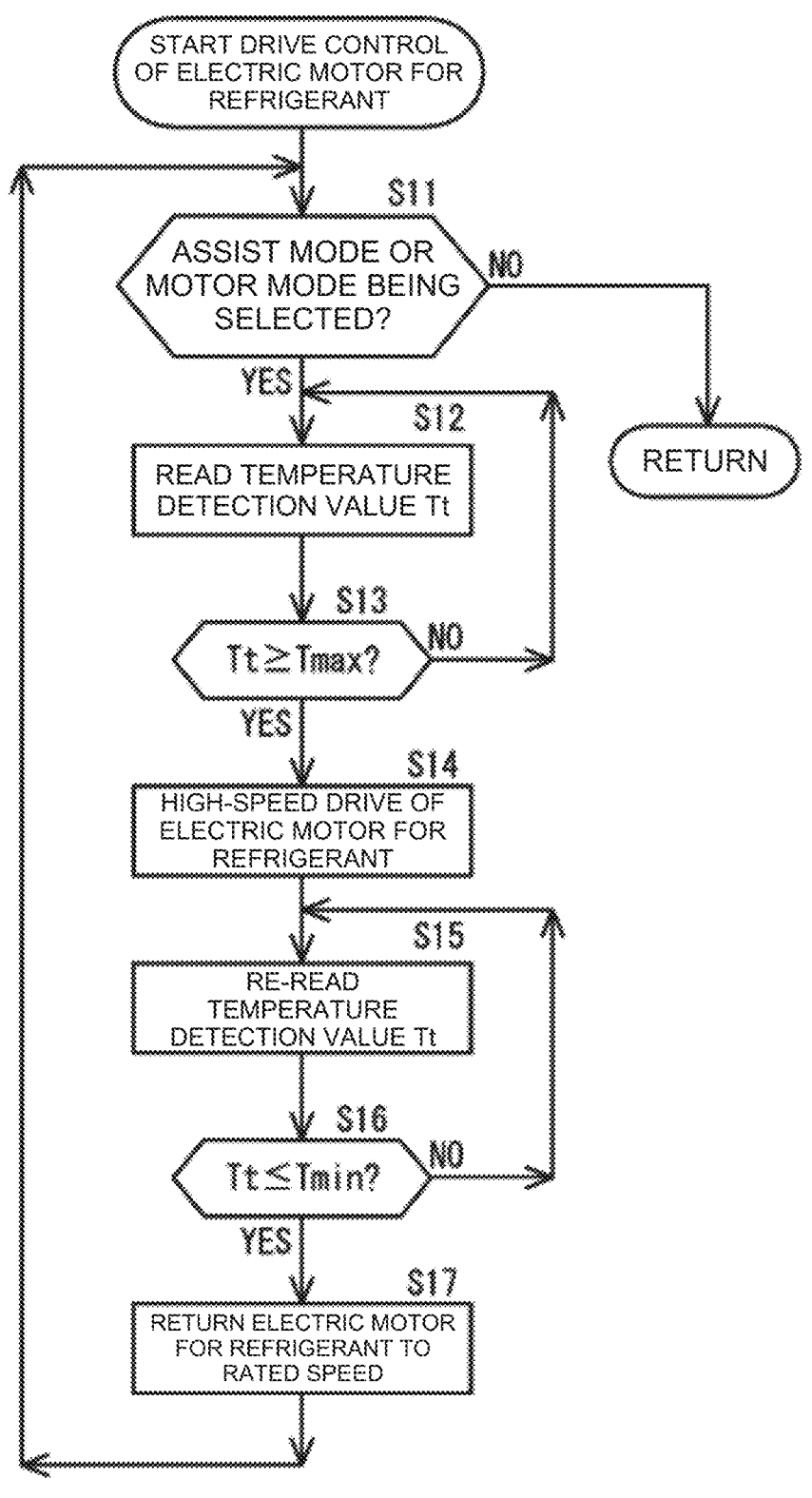
FIG. 8 is a second example of a flowchart of the drive control of the electric motor for refrigerant.

A flowchart in FIG. 8 shows a second example of the drive control of the electric motor 73 for refrigerant (discharge-amount control of the second refrigerant pump 74). Here, too, it is assumed that the electric motor 73 for refrigerant is driving at the rated speed so that the second refrigerant pump 74 realizes a predetermined discharge amount.

In the second example, if the assist mode or the motor mode is being selected by the operation of the selection switch 94 (S11: YES), the generator motor 30 is functioning as an electric motor and thus, the controller 100 reads the temperature detection value Tt of the temperature sensor 93 (S12) and determines whether the temperature detection value Tt is equal to or larger than the temperature upper-limit set value Tmax set in advance (S13).

In this case, it is preferable that the temperature upper-limit set value Tmax is set to a value of approximately 90° C., for example. The reason why the temperature upper-limit set value Tmax is set to the value around 90° C. is as explained in the first example. In other words, when the hydraulic oil temperature becomes higher than 90° C., for example, sealing components formed of a synthetic resin, rubber or the like, which is susceptible to a high temperature, can be damaged easily, and the oil-film forming capability when the hydraulic oil is used as lubricating oil is drastically deteriorated, whereby gear damage can be caused easily. At Step S13, the temperature upper-limit current value Tmax itself may be included on a lower side or a higher side. At Step S13, it is included on the higher side.

At Step S13, if the temperature detection value Tt is equal to or larger than the temperature upper-limit set value Tmax (Tt≥Tmax, S13: YES), the hydraulic oil temperature passing through the generator motor 30 has risen and thus, the electric motor 73 for refrigerant is driven at a speed higher than the rated speed so as to increase the discharge amount of the second refrigerant pump 74 (S04). As the result of the increased discharge amount of the second refrigerant pump 74 by the high speed drive of the second oil cooler 58, the hydraulic oil is sufficiently cooled. The generator motor 30 and the inverter 29 are then quickly oil-cooled. At Step S13, if the temperature detection value Tt is less than the temperature upper-limit set value Tmax (Tt<Tmax, S13: NO), the processing returns to Step S12.

After driving the electric motor 73 for refrigerant at the high speed at Step S14, the temperature detection value Tt is read again by the temperature sensor 93 (S15), and it is determined whether the temperature detection value Tt is equal to or smaller than the temperature lower-limit set value Tmin set in advance (S16). In this case, it is preferable that the temperature lower-limit set value Tmin is set to a value of approximately 70° C., for example. The reason why the temperature lower-limit set value Tmin is set to the value around 70° C. is as explained in the first example. In other words, when the temperature of the hydraulic oil falls below 70° C., for example, the oil-film forming capability of the hydraulic oil when used as a lubricating oil becomes high enough to exert a high effect in preventing gear damage, and the agitation resistance becomes low. At Step S16, too, the temperature lower-limit set value Tmin itself may be included on a lower side or a higher side. At Step S16, it is included on the lower side.

At Step S16, if the temperature detection value Tt is equal to or smaller than the temperature lower-limit set value Tmin (Tt≤Tmin, S16: YES), it is considered that the hydraulic oil temperature passing through the generator motor 30 has been kept low and thus, the drive speed of the electric motor 73 for refrigerant is returned to the original rated speed so as to return the discharge amount of the second refrigerant pump 74 to the original predetermined discharge amount (S17). At Step S16, if the temperature detection value Tt is larger than the temperature lower-limit set value Tmin (Tt>Tmin, S16: NO), the processing returns to Step S15.

After returning the drive speed of the electric motor 73 for refrigerant to the original rated speed at Step S17, the processing returns to Step S11.

When controlled as described above, too, the controller 100 can determine high or low of the temperature of the hydraulic oil passing through the generator motor 30 on the basis of the temperature detection value Tt detected by the temperature sensor 93 as the temperature detection unit and increase or decrease the discharge amount of the refrigerant pump 74 when necessary, by controlling the drive of the electric motor 73 for refrigerant. Unnecessary and excessive drive of the electric motor 73 for refrigerant and the second refrigerant pump 74 can be suppressed, and an unpleasant drive noise of the electric motor 73 for refrigerant or the second refrigerant pump 74 can be reduced without impairing a cooling effect of the generator motor 30 by the hydraulic oil. Moreover, power consumption can also be suppressed by the drive control of the electric motor 73 for refrigerant. In other words, the working effects similar to the case of the first example are exerted.

Figure 9:
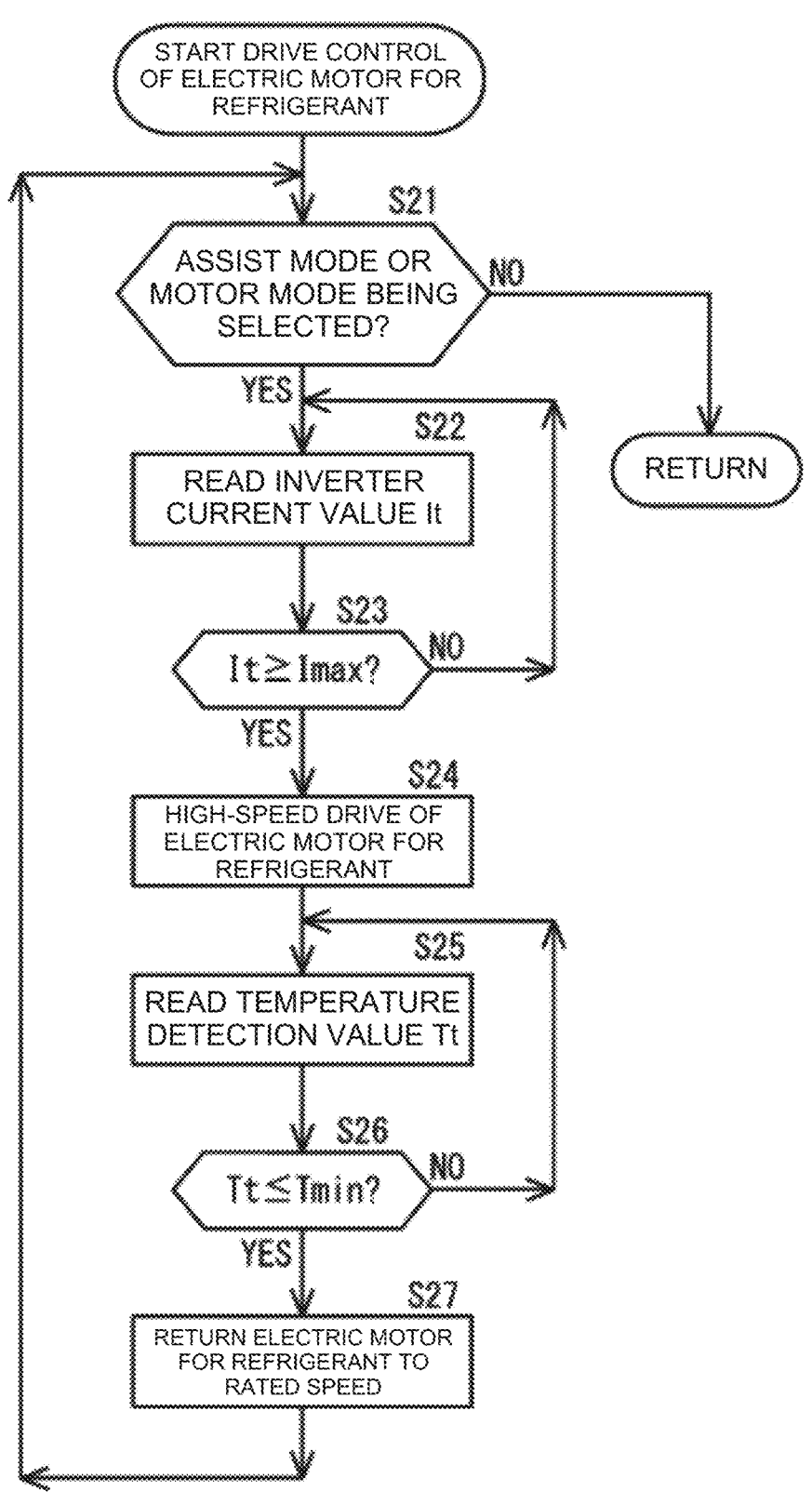
FIG. 9 is a third example of a flowchart of the drive control of the electric motor for refrigerant.

A flowchart in FIG. 9 shows a third example of the drive control of the electric motor 73 for refrigerant (discharge-amount control of the second refrigerant pump 74). The third example shown in the flowchart in FIG. 9 is a combination of the first example and the second example. Here, too, it is assumed that the electric motor 73 for refrigerant is driving at the rated speed so that the second refrigerant pump 74 realizes a predetermined discharge amount.

In the third example, if the assist mode or the motor mode is being selected by the operation of the selection switch 94 (S21: YES), the generator motor 30 is functioning as an electric motor and thus, the controller 100 reads the inverter current value It, which is the output current value of the inverter 29, at the load detection unit 101 (S22) and determines whether the inverter current value It is equal to or larger than the load upper-limit set value Imax set in advance (S23).

In this case, it is preferable that the load upper-limit set value Imax is set to a value corresponding to a case where the temperature of the hydraulic oil (cooling oil) passing through the generator motor 30 is approximately 90° C., for example. The reason why the load upper-limit set value Imax is set to a value corresponding to a hydraulic oil temperature of around 90° C. is as explained in the first example and the second example. At Step S23, the load upper-limit current value Imax itself may be included on a lower side or a higher side. At Step S23, it is included on the higher side.

At Step S23, if the inverter current value It is larger than the load upper-limit set value Imax (It≥Imax, S23: YES), a load torque of the generator motor 30 increases and a large output current flows from the inverter 29 in order to maintain the output rotation speed of the generator motor 30 and thus, it is obvious that, if such a state continues for a long time, the temperature of the hydraulic oil passing through the generator motor 30 and the inverter 29 will rise rapidly.

Thus, in order to prevent a rapid rise in the temperature of the hydraulic oil, the electric motor 73 for refrigerant is driven at a speed higher than the rated speed so as to increase the discharge amount of the second refrigerant pump 74 (S24). As the result of the increased discharge amount of the second refrigerant pump 74 by the high speed drive of the second oil cooler 58, the hydraulic oil is sufficiently cooled. The generator motor 30 and the inverter 29 are then quickly oil-cooled. At Step S23, if the inverter current value It is less than the load upper-limit set value Imax (It<Imax, S23: NO), the processing returns to Step S22.

After driving the electric motor 73 for refrigerant at the high speed at Step S24, the temperature detection value Tt is read by the temperature sensor 93 (S25), and it is determined whether the temperature detection value Tt is equal to or smaller than the temperature lower-limit set value Tmin set in advance (S26). In this case, it is preferable that the temperature lower-limit set value Tmin is set to a value of approximately 70° C., for example. The reason why the temperature lower-limit set value Tmin is set to the value around 70° C. is as explained in the first example and the second example. At Step S26, too, the temperature lower-limit set value Tmin itself may be included on a lower side or a higher side. At Step S26, it is included on the lower side.

At Step S26, if the temperature detection value Tt is equal to or smaller than the temperature lower-limit set value Tmin (Tt≤Tmin, S26: YES), it is considered that the hydraulic oil temperature passing through the generator motor 30 has been kept low and thus, the drive speed of the electric motor 73 for refrigerant is returned to the original rated speed so as to return the discharge amount of the second refrigerant pump 74 to the original predetermined discharge amount (S27). At Step S26, if the temperature detection value Tt is larger than the temperature lower-limit set value Tmin (Tt>Tmin, S26: NO), the processing returns to Step S25.

After returning the drive speed of the electric motor 73 for refrigerant to the original rated speed at Step S27, the processing returns to Step S21.

When controlled as described above, too, the controller 100 can determine the size of the load acting on the generator motor 30 on the basis of the inverter current value It detected by the load detection unit 101 or determine high or low of the temperature of the hydraulic oil passing through the generator motor 30 on the basis of the temperature detection value Tt detected by the temperature sensor 93 and increase or decrease the discharge amount of the refrigerant pump 74 when necessary by controlling the drive of the electric motor 73 for refrigerant. Unnecessary and excessive drive of the electric motor 73 for refrigerant and the second refrigerant pump 74 can be suppressed, and an unpleasant drive noise of the electric motor 73 for refrigerant or the second refrigerant pump 74 can be reduced without impairing a cooling effect of the generator motor 30 by the hydraulic oil. Moreover, power consumption can also be suppressed by the drive control of the electric motor 73 for refrigerant. In other words, the working effects similar to the cases of the first example and the second example are exerted.

In particular, in the third example, since start of a rise in the hydraulic oil temperature is determined by the size of the load acting on the generator motor 30 on the basis of the inverter current value It, the rise in the hydraulic oil temperature can be dealt with quickly, and the rise in the hydraulic oil temperature can be suppressed.

The configuration of each component in the present invention is not limited to the illustrated embodiments, and various changes can be made in a range not departing from the spirit of the present invention.

REFERENCE SIGNS LIST

1 Yacht (ship)
5 Propeller
15 Propulsion shaft
16 Engine
18 Reduction and reversing gear unit
25 Forward/reverse rotation mechanism
30 Generator motor
50 Hydraulic circuit
51 Hydraulic oil passage
55 Lubrication and cooling oil passage
58 Second oil cooler
72 Second refrigerant piping
73 Electric motor for refrigerant
93 Temperature sensor (temperature detection unit)
94 Selection switch
100 Controller (control unit)
101 Load detection unit

The invention claimed is:

1. A reduction and reversing gear unit transmitting power of at least either one of an engine and a generator motor mounted on a ship to a propeller via a forward/reverse rotation mechanism, comprising:

an oil cooler disposed in a cooling oil passage that supplies hydraulic oil from an oil tank to the generator motor as cooling oil, a refrigerant pump disposed in a refrigerant piping caused to communicate with the oil cooler, an electric motor that drives the refrigerant pump, and a control unit that controls drive of the electric motor such that a discharge amount of the refrigerant pump is changed in accordance with a load detection value of a load detection unit that detects a load acting on the generator motor.

2. The reduction and reversing gear unit according to claim 1, wherein when the load detection value of the load detection unit exceeds a load upper-limit set value set in advance, the control unit drives the electric motor such that the discharge amount of the refrigerant pump is increased.

3. The reduction and reversing gear unit according to claim 1, wherein when the load detection value of the load detection unit falls below a load lower-limit set value set in advance, the control unit drives the electric motor such that the discharge amount of the refrigerant pump is decreased.

4. A reduction and reversing gear unit transmitting power of at least either one of an engine and a generator motor mounted on a ship to a propeller via a forward/reverse rotation mechanism, comprising:

an oil cooler disposed in a cooling oil passage that supplies hydraulic oil from an oil tank to the generator motor as cooling oil, a refrigerant pump disposed in a refrigerant piping caused to communicate with the oil cooler, an electric motor that drives the refrigerant pump, and a control unit that controls drive of the electric motor such that a discharge amount of the refrigerant pump is changed in accordance with a temperature detection value of a temperature detection unit that detects a temperature of the hydraulic oil in the cooling oil passage.

5. The reduction and reversing gear unit according to claim 4, wherein when the temperature detection value of the temperature detection unit exceeds a temperature upper-limit set value set in advance, the control unit drives the electric motor such that the discharge amount of the refrigerant pump is increased.

6. The reduction and reversing gear unit according to claim 4, wherein when the temperature detection value of the temperature detection unit falls below a temperature lower-limit set value set in advance, the control unit drives the electric motor such that the discharge amount of the refrigerant pump is decreased.

7. A reduction and reversing gear unit transmitting power of at least either one of an engine and a generator motor mounted on a ship to a propeller via a forward/reverse rotation mechanism, comprising:

an oil cooler disposed in a cooling oil passage that supplies hydraulic oil from an oil tank to the generator motor as cooling oil, a refrigerant pump disposed in a refrigerant piping caused to communicate with the oil cooler, an electric motor that drives the refrigerant pump, and a control unit that controls drive of the electric motor such that a discharge amount of the refrigerant pump is changed in accordance with a load detection value of a load detection unit that detects a load acting on the generator motor and a temperature detection value of a temperature detection unit that detects a temperature of the hydraulic oil in the cooling oil passage.

8. The reduction and reversing gear unit according to claim 7, wherein when the load detection value of the load detection unit exceeds a load upper-limit set value set in advance, the control unit drives the electric motor such that the discharge amount of the refrigerant pump is increased; and when the temperature detection value of the temperature detection unit falls below a temperature lower-limit set value set in advance, the control unit drives the electric motor such that the discharge amount of the refrigerant pump is decreased.

* * * * *